United States Patent [19]

Sproul et al.

[11] 3,869,538

[45] Mar. 4, 1975

[54] PROCESS FOR PRODUCING SODIUM CARBONATE FROM TRONA

[75] Inventors: Jared Sanford Sproul, Fanwood; Eric Rau, Trenton, both of N.J.

[73] Assignee: Intermountain Research and Development, Green River, Wyo.

[22] Filed: Jan. 10, 1973

[21] Appl. No.: 322,294

[52] U.S. Cl............... 423/206, 423/427, 423/659 F
[51] Int. Cl................................................ C01d 7/12
[58] Field of Search .......... 423/201, 206, 207, 209, 423/421, 425, 427, 438, 659, 659 F; 23/277 R

[56] References Cited
UNITED STATES PATENTS

| | | | |
|---|---|---|---|
| 2,459,414 | 1/1949 | Carrier................................ | 423/427 |
| 2,498,710 | 2/1950 | Roetheli........................... | 423/438 X |
| 3,131,996 | 5/1964 | Seglin et al........................ | 423/206 |
| 3,260,567 | 7/1966 | Hellmers et al..................... | 423/209 |
| 3,333,918 | 8/1967 | Gancy et al........................ | 423/426 |
| 3,482,934 | 12/1969 | Di Bello et al..................... | 423/427 |
| 3,528,766 | 9/1970 | Coglaiti, Jr. et al. ........... | 423/427 X |

Primary Examiner—O. R. Vertiz
Assistant Examiner—Gary P. Straub

[57] ABSTRACT

Crushed crude trona is calcined to crude sodium carbonate in a fluidized-bed reactor at a temperature of 125°–225°C, preferably at a temperature of 125°–175°C. The fluidized-bed reactor both calcines the crushed trona, and separates fine particles of crushed trona from the coarse portion of the charge. Overcalcination of fine particles is avoided and formation of soluble organic compounds is minimized. Resultant crude sodium carbonate with low soluble organic content is advantageous for further processing to refined sodium carbonate.

8 Claims, No Drawings

PROCESS FOR PRODUCING SODIUM CARBONATE FROM TRONA

This invention relates to an improved process for the production of sodium carbonate from crude trona.

In Sweetwater and adjacent counties in the vicinity of Green River, Wyoming, trona deposits are found at depths ranging from about 800 to 1800 feet underground. The main trona bed varies from 8 to 18 feet in thickness, and other beds of less thickness separated by layers of shale are usually found above the main trona bed. The trona consists chiefly of sodium sesquicarbonate ($Na_2CO_3 \cdot NaHCO_3 \cdot 2H_2O$) and about 4 to 12 percent insoluble materials consisting mainly of shale. A typical analysis of the crude trona from which the larger pieces of shale have been removed is:

| Constituent | Percent |
| --- | --- |
| $Na_2CO_3$ | 43.51 |
| $NaHCO_3$ | 36.11 |
| $H_2O$ | 13.14 |
| $Na_2SO_4$ | 0.02 |
| NaCL | 0.08 |
| $Fe_2O_3$ | 0.14 |
| Organic matter | 0.30 |
| Insolubles | 6.70 |

Various processes for the production of sodium carbonate from the sodium sesquicarbonate are known. In the "sesquicarbonate process," trona ore is crushed and dissolved, the solution is treated with activated carbon to remove soluble organic compounds, filtered, and cooled to obtain crystallization of sodium sesquicarbonate. The sesquicarbonate is then calcined to sodium carbonate.

In the "monohydrate process," trona ore is crushed, calcined to convert sodium bicarbonate values to sodium carbonate, and dissolved; the solution is filtered, treated with activated carbon to remove soluble organic compounds, and evaporated to crystallize sodium carbonate monohydrate. The monohydrate is dried to produce anhydrous sodium carbonate.

In either of the above processes, if the soluble organic compounds are not removed they cause foaming and impair proper crystal formation in the crystallization step. Treatment with activated carbon to remove soluble organic compounds is therefore used in order to improve the quality of the crystal precursor from which the final sodium carbonate product is obtained.

As an alternate to treatment with activated carbon in the "monohydrate process," soluble organic compounds may be removed by carrying out the calcination of crude trona at 400°–800°C, as taught by Seglin et al in U.S. Pat. No. 2,962,348. Calcination of crude trona at temperatures above 400°C has the disadvantage that insoluble siliceous material in the trona is converted to soluble silicates which can be removed only with difficulty; if not removed, the soluble silicates foul heat exchange surfaces during the subsequent evaporative crystallization of the sodium carbonate monohydrate.

Calcination of trona below 400°C to avoid soluble silicate formation introduces another problem, in that at temperatures between about 225° and 275°C additional soluble organic compounds will be produced from the oil shale present in the crude trona, increasing the quantity of activated carbon required to remove said soluble organic compounds in the clarification step before crystallization. In U.S. Pat. No. 3,260,567, Hellmers et al teach calcination of crude trona at a temperature between about 150°C and below about 200°C in a gas-fired drier of undesignated structure, in order to minimize formation of additional soluble organics.

When crude trona is crushed, a broad distribution of particle sizes is obtained. Typical sizings, expressed throughout in terms of U.S. Standard Sieves, illustrate this. For example, ore crushed to 100% –⅜ inch mesh is typically 0% +⅜ inch, 25% +4 mesh, 80% +100 mesh, and 90% +270 mesh. At 100% –¼ inch mesh, a typical distribution of 0% +¼ inch, 10% +4 mesh, 50% +16 mesh, 75% +100 mesh, and 90% +325 mesh. Ore crushed to pass 8 mesh 100% will typically be 0% +8 mesh, 20% +20 mesh, 35% +40 mesh, 50% +100 mesh, 65% +200 mesh, and 80% +400 mesh. Using the entire product from a crushing circuit provides more efficient use of the raw material than if the product is separated into fractions of narrower range. In addition, crude trona from the mine is moist and difficult to separate below about 20 mesh. It is therefore preferred to feed the discharge from the crushing circuit directly to a calciner without an intervening separation step.

In practice, crushed trona of broad size range is typically heated in a direct-fired rotary calciner at about 150°–250°C. Because there is a temperature gradient in such a calciner, overcalcination occurs in the hot end of the calciner, especially near the surface of particles which become overexposed to the hot gases. Fine particles collected from the calciner therefore contain a higher level of soluble organic compounds than the coarse particles in the product. Costs of activated carbon required for removal of the increased organic compounds rise correspondingly.

It has now been found that when crushed trona of broad size range is calcined to crude sodium carbonate in a fluidbed calciner at 125°–225°C, a more uniform temperature can be maintained than in a rotary calciner, and unexpectedly, fine particles from a fluid-bed calciner are found to contain lower levels of soluble organic compounds than the coarse particles contain. In contrast with the product from a rotary calciner, fine particles do not become overcalcined, and no concomitant increase in formation of soluble organic material is obtained.

In the practice of this invention, crushed crude trona is fed to a hollow, substantially vertical, tubular vessel with a perforated bottom which separates an upper fluidizing chamber from a lower plenum chamber. A stream of gas is passed into the plenum chamber, up through the perforated bottom and upward through the crushed trona in the fluidizing chamber of the reactor at a velocity sufficient to maintain a portion of the charge in fluid suspension, and to sweep away the decomposition gases such as water vapor and carbon dioxide, which are evolved during the reaction. The fluidized reactor acts both as a calciner for the crushed trona, and as a separator to remove fine particles of crushed trona from the coarse portion of the charge remaining in fluid suspension in the fluidized bed. Fine particles of crushed trona become entrained in the effluent gases and are carried from the fluidized bed before they become overcalcined, or in some cases completely calcined. These entrained solids are then further heated outside the fluidized bed in order to complete the calcination by introducing additional heated gases to the effluent gas stream in the calciner above the fluidized bed, or by separating fine particles for flash-calcining in an external unit. Residence time of entrained dust in a heating section for effluent gases or in a flash calciner for separated dust is limited in order to limit formation of additional soluble organic materials.

Fine particles of crushed trona which are separated from the coarse particles remaining in the fluidized bed by entrainment in the gases effluent from the bed may be further heated while they are still in the reactor by introducing secondary heated gases to the reactor above the upper surface of the fluidized bed, and subsequently separated from the effluent gas stream after it has passed out of the reactor.

If secondary heated gases are not introduced to the reactor, the entrained fine particles will be separated from the effluent gases outside the reactor, and further heated in an external flash calciner. Suitable insulation of the cyclone separator used to separate the entrained solids from the effluent gases can provide such an external flash calciner or the flash calciner can be an entirely separate heated unit which receives the solids outflow from the cyclone separator. The separate heated unit can be a second fluidized-bed reactor, for example.

Crushed trona can be fed to the fluidized bed intermittently, and calcined product removed from the bed at intervals. It is preferred, however, to feed crushed trona continuously to the fluidized bed, and simultaneously and continuously to remove the calcined product from the bed.

The bed temperature, the particle size distribution of the feed, the fluidization velocity, and the disengaging space above the fluidized bed in the calciner vessel are factors which affect the quantity of entrained solids to be further heated and separated from the effluent gases or separated and then further heated, in order to insure complete calcination.

The thermal energy required to effect the conversion of crude trona to crude sodium carbonate may be supplied by heating the fluidizing gas or by placing heating means within or around the bed, preferably within the bed.

The bed temperature is 125°–225°C, preferably 125°–175°C, more preferably 150°C. Below 125°C, the required residence time for complete calcination may become longer than preferred. Above 200°C and especially above 225°C, more soluble organic compounds are formed.

Heat may be supplied to the fluidized bed directly by preheating the fluidizing gases in a direct oil- or gas-fired combustion chamber to about 800°C, or alternatively heat may be transferred indirectly from tubes located within the fluidized bed which are heated with high-pressure steam, diphenyldiphenyloxide eutectic mixture, or another indirect-heating medium.

For a direct-fired fluidized bed, a plenum temperature of about 800°C is preferred. At lower temperatures, the fuel economy suffers. At temperatures above 825°C, the crude trona will melt and fuse on the perforated bottom of the fluid-bed calciner vessel, so higher temperatures are to be avoided. Both the combustion chamber for the gases and the plenum chamber of the calciner vessel will require refractory linings to endure temperature in this range. Operating costs for the direct-fired unit will necessarily include shutdown time, labor, and materials costs for refractory repair. For an indirectheated unit, the plenum temperature can be any convenient temperature from ambient to no higher than 825°C, and will preferably be a temperature sufficiently low to avoid a requirement for refractory lining in the plenum chamber and thereby to avoid refractory repair costs.

In an indirect-heated fluidized bed, the heat transfer tubes are preferably packed closely, for example on 3 to 4 inch centers, to keep the bed diameter small. These tubes interfere with mixing in a large fluid bed, say greater than 8 feet diameter. Therefore, regions near feed entry points are colder than elsewhere in the bed. From these cold regions, dust entrains that is only partially calcined.

The preferred feed size distribution of crushed trona depends on the method of heating. Minus 8 mesh feed is preferred for an indirect-heated fluid bed. At finer sizings, the amount of dust smaller than 5 microns becomes excessive, which complicates dust recovery and pollution control equipment. To supply a direct-fired fluid bed, a coarser feed sizing is preferred, about −⅜ inch or −¼ inch mesh. At coarse sizings, the fluid-bed height must be raised to provide enough residence time for complete calcination.

The required fluidization velocity depends on the particle sizing of the bed. For an extremely broad particle size distribution such as is characteristic of crushed trona, the fluidization velocity should be held within narrow limits. Otherwise either dust entrainment will be excessive or the coarsest particles will not be satisfactorily fluidized. For −8 mesh feed, a fluidization velocity of 1.7 to 2.5 feet/second is preferred. For −¼ inch feed, a fluidization velocity of 6 to 7 feet/second is preferred. For −⅜ inch feed, a fluidization velocity of 8 to 10 feet/second is preferred. Fluidization velocity is defined in conventional terms as the volumetric flow of gases at the top of the fluidized bed (using the effluent gas composition) divided by the crosssectional area of the bed.

The residence time required for complete calcination depends on the particle size distribution and the bed temperature. For a well mixed fluidized bed with continuous feed, a residence time of about 40 minutes (bed weight ÷ bed discharge rate) is required at 175°C. The average residence in a continuously-fed fluid bed must be longer than in a batchoperated unit, since some feed to the continuous unit will have much less than average residence time. If the fluid bed is designed so the solids flow behavior is intermediate between perfect mixing and piston flow, then less residence is required.

Adequate height between the top of the dense fluidized phase and the top of the vessel should be provided to allow fine particles to disengage, thereby limiting requirements for supplementary heating to calcine entrained dust completely. Adequate disengaging height is especially important where the particle size distribution is broad, as in the practice of the present invention. For a small unit less than 3 feet diameter, 5 to 8 feet above the top of the bed is sufficient. For a commercial fluid bed of 15 to 25 feet diameter, at least 15 to 20 feet above the top of the bed is preferred.

The following examples are given to illustrate the present invention, but are not intended to be limiting thereof. Temperatures are in °C and mesh sizings are U.S. Standard Sieve.

EXAMPLE 1

Minus 8 mesh crude trona was continuously fed to an 18 inch diameter fluidized bed at 600 lb/hour. The bed was maintained at 175°C and the plenum chamber was at 790°C. The bed weight was 180 lb. The fluidization velocity was 2.5 feet/second. About 115 lb/hour of entrained dust was directed into a cyclone dust collector at 150°C. Both the bed discharge and the cyclone catch were fully calcined, with ignition loss less than 0.4 percent. The bed discharge (238 lb/hour) contained 146 ppm carbon in 30 percent sodium carbonate solution, cyclone catch (110 lb/hour) contained 85 ppm carbon in 30 percent sodium carbonate solution, and the weighted average for product was 127 ppm carbon. Feed to the fluid bed was analyzed for soluble organics, again expressed as ppm carbon in 30 percent sodium carbonate solution: −8 +20 mesh, 70 ppm; −20 +100 mesh, 56 ppm; −100 mesh, 56 ppm; composite, 61 ppm. Thus product from the fluid bed, averaging 127 ppm carbon, had 2.08 times the soluble carbon present in the feed.

EXAMPLE 2

Minus ¼ inch crude trona was fed to the 18 inch diameter fluid bed at 477 lb/hour. Bed temperature was 177°, plenum temperature was 380°, and the cyclone temperature was 163°. The fluidization velocity was 6.5 feet/second. The bed weight was 150 lb. Feed to the fluid bed contained 68 ppm soluble organics as carbon in 30 percent sodium carbonate solution. The bed discharge (126 lb/hour) showed 0.26 percent ignition loss and 183 ppm carbon. Dust collected in the cyclone (132 lb/hour) contained 103 ppm carbon. Product, including both bed discharge and cyclone catch, averaged 142 ppm carbon, or 2.09 times the level in the feed.

COMPARATIVE EXAMPLE A

Minus ⅜ inch trona ore was continuously fed at 240 lb/hour to a 15 inch diameter × 8 foot gas-fired cocurrent rotary calciner. Gas was preheated in a separate combustion chamber to a maximum of 760° and fed to the calciner at about 120 SCFM. The calciner was rotated at 10 rpm. Flights provided good showering action. Holdup in the calciner was about 60 lb. Feed to the calciner was found on analysis to contain soluble organic matter as follows: composite, 102 ppm; −⅜ inch +8 mesh, 96 ppm; −8 +20 mesh, 94 ppm; −20 +100 mesh, 122 ppm, and −100 mesh, 92 ppm carbon in 30 percent sodium carbonate solution. The calciner spill, discharging at 179°, contained 265 ppm carbon. Effluent gases were fed to a cyclone dust collector. Dust collector in the cyclone contained 365 ppm carbon. Calciner spill was about 160 lb/hour and cyclone catch about 20 lb/hour. Product, including both calciner spill and cyclone catch, averaged 276 ppm carbon or 2.71 times the level in the feed.

EXAMPLE 3

Minus 8 mesh trona ore with a particle size distribution of 1.06% +10, 21.79% −10 +20, 21.08% −20 +50, 11.42% −50 +100, 12.60% −100 +200, 14.79% −200 +400, 17.24% −400, had an ignition loss of 26.96 percent and a soluble organics concentration of 80 ppm carbon in 30 percent sodium carbonate solution. This trona ore was fed continuously to an 18 inch diameter fluidized-bed calciner at 204 lb/hour. The fluidization velocity was 2.5 ft/second, bed weight 142 lb, and the average residence time was 42 minutes. Results of a series of runs at bed temperatures of 135°, 119°, and 105° are recorded in Table I. Solids discharged from the bed were essentially completely calcined at these temperatures with only a slight increase in soluble carbon content of the calcinate. Dust collected from the cyclone was less completely calcined, and showed no increase in soluble organic content. Average soluble organic content for the combined discharge ranged from 0.83 to 0.95 times the soluble organic content present in the feed.

Table I

| Fluidized-Bed Calcination of Trona Ore | | | | | | | | | |
|---|---|---|---|---|---|---|---|---|---|
| Temperature °C | | | Discharge Rate, lb/hour | | Residual Ignition Loss, wt % | | Soluble Organic, ppm C* | | |
| Bed | Plenum | Cyclone | Bed | Cyclone | Bed | Cyclone | Bed | Cyclone | Average |
| 135 | 335 | 67 | 65.9 | 76.8 | 0.2 | 3.5 | 107 | 48 | 76 |
| 119 | 345 | 62 | 65.6 | 70.5 | 0.1 | 3.2 | 89 | 48 | 68 |
| 105 | 280 | 57 | 53.4 | 76.2 | 0.3 | 9.0 | 99 | 44 | 67 |

Pursuant to the requirement of the patent statutes, the principle of this invention has been explained and exemplified in a manner so that it can be readily practiced by those skilled in the art, such exemplification including what is considered to be the best embodiment of the invention. However, it should be clearly understood that, within the scope of the appended claims, the invention may be practiced by those skilled in the art, and having the benefit of this disclosure, otherwise than as specifically described and exemplified herein.

We claim:

1. In a process for preparing crude sodium carbonate from crude trona by calcining crushed crude trona, the improvement which comprises the following steps:
    a. feeding crushed crude trona, ranging in particle size distribution from about 100% −⅜ inch mesh with a maximum of 10% −270 mesh, to about 100% −8 mesh with a maximum of 20% −400 mesh, into a fluid-bed calciner wherein a fluidized bed of crushed trona is formed by the action of gases introduced to the bottom of the bed at a controlled rate and from which bed gases are effluent;
    b. heating the crushed trona in the fluidized bed at a temperature in the range of 125°–225°C until a crude sodium carbonate of substantially uniform soluble organic content is obtained;
    c. separating a fine fraction of crushed trona from the fluidized bed by entrainment in the gases effluent from the fluidized bed,
    d. further heating the separated fine fraction of crushed trona in a range of 125°–225°C until a crude sodium carbonate of substantially uniform soluble organic content is obtained; and e. recovering the calcined product of steps b) and d).

2. The process of claim 1 wherein the crushed trona is heated to a temperature of 125°–150°C.

3. The process of claim 1 wherein the crushed trona is heated to a temperature of 150°–200°C.

4. The process of claim 1 wherein the heat for the fluidized bed is obtained from fluidizing gases entering the bed of crushed trona.

5. The process of claim 1 wherein the heat for the fluidized bed is supplied by heated heat exchange surfaces within the bed of crushed trona.

6. The process of claim 1 wherein the feeding of crushed trona into the calciner and recovery of the calcined trona feed as calcined product from the fluidized bed are effected simultaneously, while maintaining a continuous fluidized bed within the calciner.

7. The process of claim 1 wherein entrained solids are separated from gases effluent from the bed before being further heated.

8. The process of claim 1 wherein entrained solids are further heated before separation from gases effluent from the bed.

* * * * *

UNITED STATES PATENT OFFICE
CERTIFICATE OF CORRECTION

PATENT NO. : 3,869,538
DATED : March 4, 1975
INVENTOR(S) : Jared Sanford Sproul and Eric Rau It is certified that error appears in the above-identified patent and that said Letters Patent are hereby corrected as shown below:

Column 2, line 12, "of" should read --is--.

Column 5, line 61, "122 ppm," should read --122 ppm;--.

Column 5, line 65, "Dust collector" should read --Dust collected--.

Table I, under heading "Discharge Rate, lb/hour", subheading "Bed", "65.6" should read --65.5--.

Table I, insert footnote as follows --*ppm C in 30% sodium carbonate solution--.

Signed and Sealed this eighth Day of June 1976

[SEAL]

Attest:

RUTH C. MASON
Attesting Officer

C. MARSHALL DANN
Commissioner of Patents and Trademarks